(12) United States Patent
Sugiyama

(10) Patent No.: US 7,513,507 B2
(45) Date of Patent: Apr. 7, 2009

(54) FLEXIBLE BOOT FOR CONSTANT VELOCITY UNIVERSAL JOINT

(75) Inventor: Shinichi Sugiyama, Fujisawa (JP)

(73) Assignee: Keeper Co., Ltd., Fujisawa-shi, Kanagawa (JP)

( * ) Notice: Subject to any disclaimer, the term of this patent is extended or adjusted under 35 U.S.C. 154(b) by 17 days.

(21) Appl. No.: 11/236,736

(22) Filed: Sep. 28, 2005

(65) Prior Publication Data

US 2006/0066062 A1    Mar. 30, 2006

(30) Foreign Application Priority Data

Sep. 30, 2004    (JP)    ............................. 2004-286091

(51) Int. Cl.
*F16J 3/00* (2006.01)
*F16J 15/52* (2006.01)
(52) U.S. Cl. ...................................... 277/635; 277/636
(58) Field of Classification Search .......... 277/634–636
See application file for complete search history.

(56) References Cited

U.S. PATENT DOCUMENTS 4,832,161 A  *  5/1989  Weiler et al. .............. 188/73.44
5,251,916 A  *  10/1993 Martin et al. ................. 277/636
5,695,202 A  *  12/1997 Cartwright et al. .......... 277/636

FOREIGN PATENT DOCUMENTS

| FR | 2 686 671   | 7/1993  |
|----|-------------|---------|
| JP | 6-45165     | 6/1994  |
| JP | 2002-295509 | 10/2002 |

* cited by examiner

*Primary Examiner*—Vishal Patel
(74) *Attorney, Agent, or Firm*—Foley & Lardner LLP

(57) ABSTRACT

A flexible boot for a constant velocity universal joint (CVJ) includes a smaller-diameter mounting portion provided at one end, a larger-diameter mounting portion provided at the other end, and a bellows portion provided between both of the mounting portions. The larger-diameter mounting portion and the bellows portion are connected to each other by a straight portion, and the smaller-diameter mounting portion and the bellows portion are connected to each other by a straight portion. An axial distance of each of the straight portions is equal to or larger than 20% of an entire axial distance from a boundary between the larger-diameter mounting portion and the adjacent straight portion to a boundary between the smaller-diameter mounting portion and the adjacent straight portion, and an axial distance of the bellows portion is in a range of 20% to 60% of the entire axial distance, so that the bellows portion is located substantially centrally in an axial direction between both of the straight portions.

6 Claims, 2 Drawing Sheets

15 deg 15 deg

FLEXIBLE BOOT FOR CONSTANT VELOCITY UNIVERSAL JOINT

BACKGROUND OF THE INVENTION

1. Field of the Invention

The present invention relates to a flexible boot for a constant velocity universal joint (CVJ) for use in a driving shaft or the like of an automobile, and particularly, to a flexible boot for CVJ for use in a driving shaft or the like for a rear axle having a small operating angle in an automobile.

2. Description of the Related Art

For a conventional flexible boot for CVJ used in a driving shaft or the like for a rear axle (which will be referred to as a flexible boot for a rear axle hereinafter), a flexible boot for CVJ used in a driving shaft or the like for a front axle (which will be referred to as a flexible boot for a front axle hereinafter) is appropriated in many cases.

The flexible boot for the front axle is constructed, as a common configuration, of a smaller-diameter mounting portion adapted to be supported on the shaft, a larger-diameter mounting portion coaxially disposed at a distance from the smaller-diameter mounting portion and having a diameter larger than that of the smaller-diameter mounting portion, and a bellows portion of a substantially triangular truncated conical shape which integrally connects the smaller-diameter mounting portion and the larger-diameter mounting portion to each other. The bellows portion includes a plurality of crests and a plurality of valleys alternately connected to one another, and a straight portion is formed between the bellows portion and the smaller-diameter mounting portion and has a length 0.1 to 16 times a distance from the center of the smaller-diameter mounting portion to the center of the larger-diameter mounting portion (for example, see JP-A-2002-295509).

In the flexible boot for the front axle, it is conventionally necessary for the function of the flexible boot to increase the development length of the bellows (the total distance of an outer periphery of the bellows portion) so as to withstand an operating angle of up to 50 degree. For this reason, the number of the crests and the valleys of the bellows portion is required to be 5 to 6, resulting in an increase in weight of the flexible boot.

On the contrast, in the flexible boot used for the rear axle, the maximum operating angle is on the order of 15 degree, and the required performance is low, as compared with the flexible boot for the front axle.

Therefore, the conventional flexible boot suffers from the following problem: When the flexible boot for the front axle is appropriated intact for the flexible boot for the rear axle, there is no deficiency in respect of the quality and the function, but the weight of the flexible boot is increased, which is unsuitable for a reduction in weight of a vehicle, and which brings about an increase in cost.

SUMMARY OF THE INVENTION

Accordingly, it is an object of the present invention to provide a flexible boot which can be made in a lightweight and compact construction, while sufficiently satisfying a performance required for a flexible boot for a rear axle.

To achieve the above object, according to the present invention, there is provided a flexible boot for a constant velocity universal joint, comprising a smaller-diameter mounting portion provided at one end and adapted to be mounted on a shaft member of the constant velocity universal joint, and a larger-diameter mounting portion provided at the other end and adapted to be mounted on an outer ring of the constant velocity universal joint, a bellows portion having one or more crests and valleys being provided between both of said mounting portions, wherein the larger-diameter mounting portion and the bellows portion are connected to each other by a straight portion; the smaller-diameter mounting portion and the bellows portion are connected to each other by a straight portion; and an axial distance of each of the straight portions is equal to or larger than 20% of an entire axial distance from a boundary between the larger-diameter mounting portion and the adjacent straight portion to a boundary between the smaller-diameter mounting portion and the adjacent straight portion, so that the bellows portion is located substantially centrally in an axial direction between both of the straight portions, and an axial distance of the bellows portion is in a range of 20% to 60% of the entire axial distance.

With the above arrangement of the flexible boot according to the present invention, it is impossible to deal with a larger operating angle, but the flexible boot is made compactly in virtue of this arrangement, bringing about an enhancement in high-speed whirling property. More specifically, the following facts (1), (2) and (3) are ensured:

(1) By connecting the bellows portion and both the mounting portions to each other by the straight portions, respectively, bellows portions conventionally provided at portions corresponding to the straight portions can be eliminated to decrease the total number of turns of the bellows, and the elimination of the bellows portions by the provision of the straight portions enables the diameter dimension to be decreased, leading to a compactness. Especially, crests having larger diameters are eliminated by forming the portion connected to the larger-diameter mounting portion as the straight portion and hence, a remarkable effect is provided for the compactness. Further, grease within the flexible boot is migrated toward the joint during rotation at a high speed by the provision of the straight portions, leading to an enhancement in high-speed whirling property.

(2) By ensuring that each of the straight portions has a predetermined length equal to or larger than 20% of the entire axial distance, the configuration is such that the bellows portion exists at the axially middle location rather than at one end. If the bellows portion is disposed at any of the mounting portions rather than at the central location, one of the straight portions is too long, resulting in a poor deforming followability and an excessively large stress applied at opposite ends of the straight portions to cause a problem in durability. In the flexible boot according to the present invention, the bellows portion exists at the axially middle location and hence, during operation of the CVJ, no excessively large stress is generated on the flexible boot, leading to an enhancement in durability of the flexible boot.

(3) If the bellows portion is longer than 60% of the entire axial distance, it is difficult to provide a compact configuration, and the whirling movement is larger during rotation at a high speed. On the other hand, if the bellows portion is shorter than 20% of the entire axial distance, the followability during operation of CVJ is poor, resulting in an excessively large stress generated. According to the present invention, both of the compactness and the durability can be reconciled by setting the length of the bellows portion in a range of 20% to 60% of the entire axial distance.

Further advantages are a reduction in weight of the flexible boot provided by the above-described configuration, a reduction in cost attributable to a decrease in amount of material used, an increased degree of freedom for a layout and the like.

According to the present invention, it is more preferable that the bellows portion of the flexible boot exists within a range of 30% to 75% of the entire axial distance. This can further enhance the above-described effect.

According to the present invention, the number of the crests and valleys of the bellows portion may be equal to or smaller than three.

If the number of the crests and valleys of the bellows portion is larger than three, the pitch of the crests and valleys is too small from the dimensional relationship to the straight portions, and when an operating angle is formed, a risk of an excessive contact is arisen. In addition, the radius of the crests and valleys must be decreased, resulting in reductions in moldability and in flexural fatigue resistance.

According to the present invention, by provision of the three or less crests and valleys, the above-described drawbacks can be overcome, and the compactness of the flexible boot can be achieved.

According to the present invention, the flexible boot may be made of a thermoplastic elastomer. This is because the concentration of a stress does not occur in virtue of the shape of the flexible boot according to the present invention, and hence, a resin material having a low pliability can be also utilized. In this case, there is an effect that the wall thickness of the flexible boot can be decreased in virtue of the rigidity of such material, leading to a reduction in weight.

The flexible boot according to the present invention can be utilized for CVJ used in a rear axle of an automobile. In this case, a larger operating angle cannot be permitted, but the flexible boot is particularly suitable for use for the area axle from the characteristics that the compactness and the reduction in weight can be achieved.

Thus, it is possible to provide the flexible boot having the lightweight and remarkably compact configuration, while satisfying the performance required for the flexible boot for the rear axle.

The above and other objects, features and advantages of the invention will become apparent from the following description of the preferred embodiment taken in conjunction with the accompanying drawings.

DETAILED DESCRIPTION OF PREFERRED EMBODIMENT

The present invention will now be described by way of an embodiment with reference to the accompanying drawings.

Figure 1:
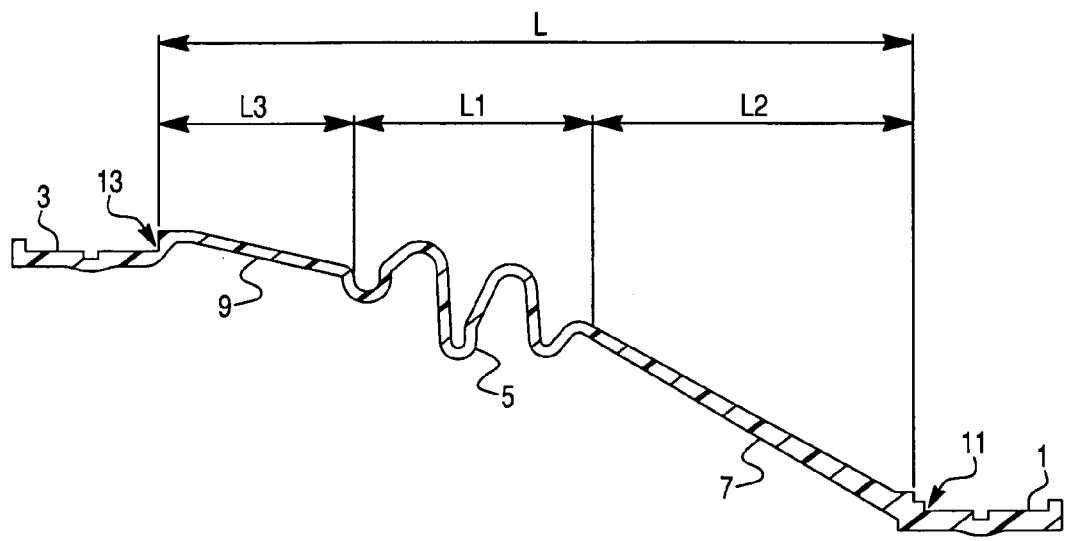
FIG. 1 is a sectional side view showing an upper half of an embodiment of a flexible boot for a rear axle according to the present invention.

FIG. 1 shows an embodiment of a flexible boot for a constant velocity universal joint (CVJ) according to the present invention.

As shown in FIG. 1, the flexible boot is constructed in the following manner: The boot is provided at its opposite ends with a smaller-diameter mounting portion 1 adapted to be mounted to a shaft member (not shown) of CVJ, and a larger-diameter mounting portion 3 adapted to be mounted to an outer ring (not shown) of CVJ. A bellows portion 5 having two crests and valleys is provided between both of the mounting portions 1 and 3. Further, the smaller-diameter portion 1 and the bellows portion 5 are connected to each other by a straight portion 7, and the larger-diameter portion 3 and the bellows portion 5 are connected to each other by a straight portion 9.

Each of the straight portions 7 and 9 is inclined from the larger-diameter side toward the smaller-diameter side in order to construct the flexible boot compactly and to enhance the high-speed whirling property by the migration of grease during rotation at a high speed, i.e., the straight portion is constructed by an inclined cylindrical portion which is tapered and rectilinear in section and which is continuously reduced in diameter in a section of from the larger-diameter side to the smaller-diameter side. It should be noted that the straight portion is not necessarily required to be inclined, and for example, the straight portion 9 may be of the same diameter from the larger-diameter side to the smaller-diameter side, or at only one of the larger-diameter side and the smaller-diameter side.

If an axial distance from a boundary 13 between the larger-diameter mounting portion 3 and the straight portion 9 to a boundary between the smaller-diameter portion 1 and the straight portion 7 is defined as an entire axial distance L, an axial distance L2 of the straight portion 7 is about 42% of the entire axial distance L; an axial distance L3 of the straight portion 9 is about 25% of the entire axial distance L; and an axial distance L1 of the bellows portion 5 is about 33% of the entire axial distance L, and the bellows portion 5 is disposed at a substantially ventral portion of the flexible boot.

Figure 2:
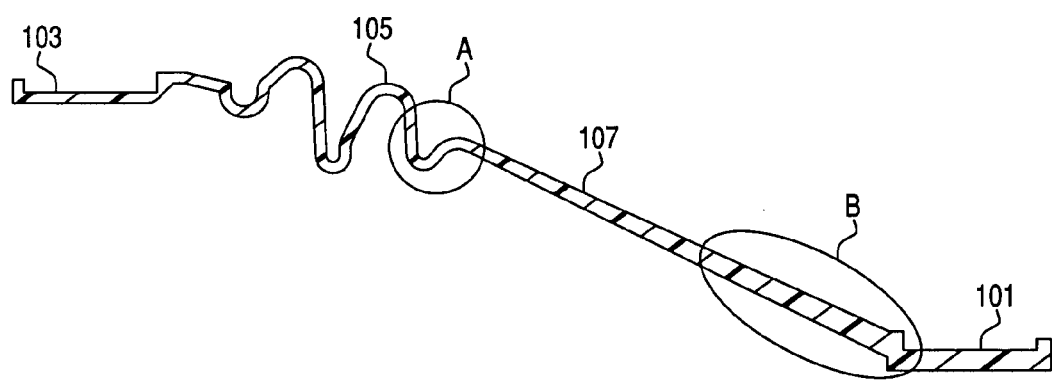
FIG. 2 is a sectional side view showing an upper half of an embodiment of a flexible boot of a configuration including a bellows portion provided at a location closer to a larger-diameter mounting portion, for comparison with the flexible boot according to the present invention.

As in a comparative example shown in FIG. 2, for example, in a configuration in which a bellows portion 105 is disposed at a location closer to a larger-diameter mounting portion 103, when CVJ is operated, a flexible boot is required to be deformed to follow the operating angle. As a result, an excessively large bending stress is generated at ends A and B of a straight portion 107 connecting the bellows portion 105 and a smaller-diameter mounting portion 101 to each other, whereby a flexible boot is broken early at the ends of the straight portion in many cases.

In contrast, in the present embodiment, even if the flexible boot follows the operation of CVJ, a stress cannot be concentrated at the straight portion and the flexible boot cannot be broken early, because the bellows portion is disposed substantially at the middle of the entire axial distance L.

Figure 3:
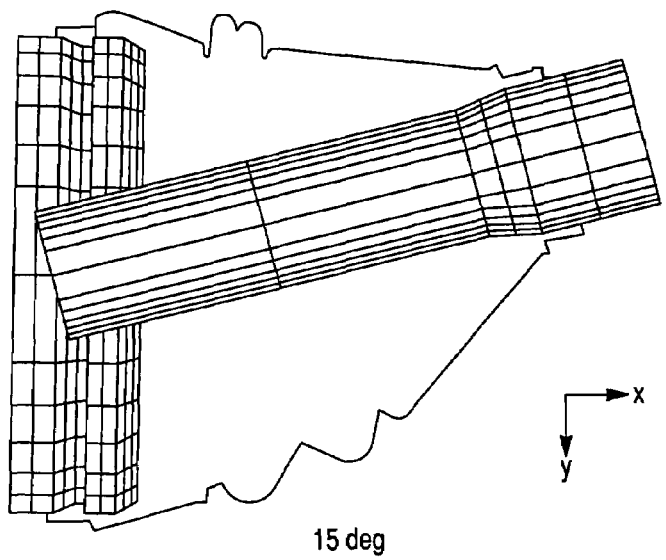
FIG. 3 is a diagram showing the result of an analysis by a finite element method for the flexible boot of the embodiment shown in FIG. 1.
Figure 4:
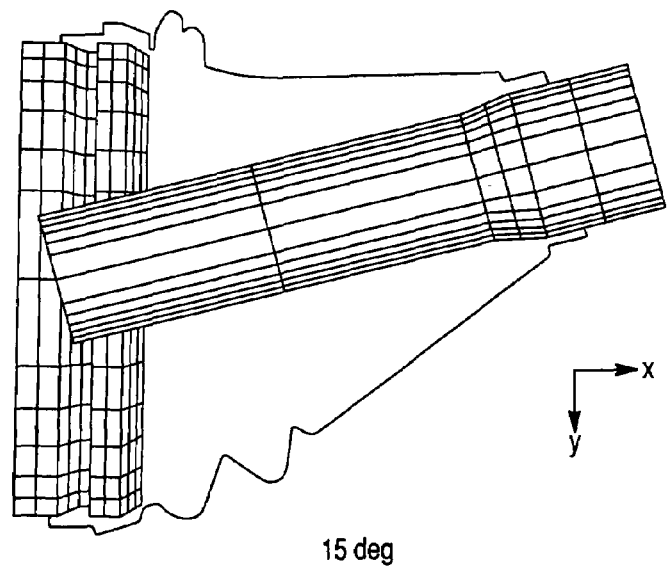
FIG. 4 is a diagram showing the result of an analysis by a finite element method for the flexible boot in the comparative example shown in FIG. 2.

This is apparent from results of analyses according to a finite element method shown in FIGS. 3 and 4. FIGS. 3 and 4 show diagrams of analyses according to FEM (finite element method) showing the results of the finite element analyses carried out when the joint-operating angle has been set at 15 degree in the flexible boot according to the embodiment shown in FIG. 1 and the flexible boot according to the comparative example shown in FIG. 2.

As can be seen from these figures, it is believed that the flexible boot according to the embodiment shown in FIG. 1 has been deformed smoothly to follow the operation of CVJ with no stress concentrated at the straight portion. In the comparative example shown in FIG. 2, however, it is believed that an excessively large bending stress has been generated at the straight portion just on the right of the bellows portion, and the buckling has been caused at the end.

Therefore, it will be understood that in the embodiment shown in FIG. 1, the flexible boot is operated without occurrence of the unreasonable concentration of the stress, but in the flexible boot shown in FIG. 2, the buckling is generated at the end, and the life of the flexible boot is liable to be shortened due to the deformation of the flexible boot.

This also applies to a case where the bellows portion is disposed at a location closer to the smaller-diameter mounting portion.

A material which may be employed includes those similar to that for a flexible boot for a front axle, such as a rubber, a resin and the like. Particularly, a resin material having a low pliability such as a thermoplastic elastomer can be also employed for the flexible boot according to the present invention, because the conspicuous concentration of the stress is not generated at the end in virtue of the configuration in which the bellows portion is disposed substantially centrally of the flexible boot. Thus, the range of materials selected is widened to contribute to a reduction in cost. In addition, the wall thickness of the flexible boot can be reduced in virtue of the rigidity of the material, leading to a reduction in weight.

In the embodiment of the present invention, the hardness of the material in a range of from 42 to 50 in terms of Shore D, i.e., from 50 to 90 in terms of Shore A can be applied for the flexible boot.

In the flexible boot according to the present invention, when the operating angle of CVJ is larger, it is difficult to accommodate this operating angle, because the number of crests and valleys is smaller. However, if the CVJ is operated at an operating angle equal to or smaller than 15 degree, then it is possible for the flexible boot to follow the operation of the CVJ, and it is possible to provide a very compact structure as a cover for the CVJ adapted to transmit the rotation.

Especially, in a flexible boot conventionally used for the front axle, a bellows portion has a large number of turns and is heavy in weight for the performance required to have to deal with even a larger operating angle. However, when the flexible boot according to the present invention is applied as a flexible boot used for a rear axle, the operating angle in the required performance is smaller and hence, the flexible boot is sufficiently satisfactory even in operation and particularly appropriate, because of a configuration having a smaller number of turns of the bellows portion, leading to a reduction in weight and a compactness.

Although the embodiment of the present invention has been described in detail, it will be understood that the present invention is not limited to the above-described embodiment, and various modifications in design may be made without departing from the spirit and scope of the invention defined in claims.

The invention claimed is:

1. A flexible boot for a constant velocity universal joint, comprising:

a smaller-diameter mounting portion provided at one end and adapted to be mounted on a shaft member of the constant velocity universal joint;

a larger-diameter mounting portion provided at the other end and adapted to be mounted on an outer ring of the constant velocity universal joint; and a bellows portion having one or more crests and valleys being provided between both of said mounting portions, wherein said larger-diameter mounting portion and said bellows portion are connected to each other by a straight portion constructed by an inclined cylindrical portion which is rectilinear in section and has a diameter continuously and gradually reduced from said larger-diameter portion to said bellows portion, wherein said smaller-diameter mounting portion and said bellows portion are connected to each other by a straight portion constructed by an inclined cylindrical portion which is rectilinear in section and has a diameter continuously and gradually reduced from said bellows portion to said smaller-diameter mounting portion, wherein an axial distance of each of said straight portions is equal to or larger than 20% of an entire axial distance from a boundary between the larger-diameter mounting portion and the adjacent straight portion to a boundary between the smaller-diameter mounting portion and the adjacent straight portion, so that said bellows portion is located substantially centrally in an axial direction between both of said straight portions, and wherein an axial distance of said bellows portion is in a range of 20% to 60% of said entire axial distance.

2. A flexible boot according to claim 1, wherein said bellows portion exists in a range of 30% to 75% of said entire axial distance from the side of said smaller-diameter mounting portion.

3. A flexible boot according to claim 1, wherein said bellows portion has three or less crests and three or less valleys.

4. A flexible boot according to claim 1, wherein said flexible boot is made of a thermoplastic elastomer.

5. A flexible boot according to claim 1, wherein said flexible boot is for a constant velocity universal joint used in a rear axle of an automobile.

6. A flexible boot according to claim 1, wherein said smaller-diameter mounting portion and said larger-diameter mounting portion are adapted to be mounted on said shaft member and said outer ring, respectively, in such a manner that inner surfaces of said straight portions are not contacted with said shaft member and said outer ring.

\* \* \* \* \*